United States Patent [19]

Collier

[11] Patent Number: 5,023,768

[45] Date of Patent: Jun. 11, 1991

[54] HIGH VOLTAGE HIGH POWER DC POWER SUPPLY

[75] Inventor: John C. Collier, Guelph, Canada

[73] Assignee: Varian Associates, Inc., Palo Alto, Calif.

[21] Appl. No.: 450,183

[22] Filed: Dec. 13, 1989

Related U.S. Application Data

[63] Continuation-in-part of Ser. No. 441,099, Nov. 24, 1989, abandoned.

[51] Int. Cl.[5] .................. H02M 3/18; H02M 7/02
[52] U.S. Cl. ................................. 363/68; 363/61; 336/175; 336/185; 378/104
[58] Field of Search ............... 363/60, 61, 68, 144; 336/90, 94, 170, 175, 185, 211; 378/101, 104

[56] References Cited

U.S. PATENT DOCUMENTS

| | | | |
|---|---|---|---|
| 3,187,208 | 6/1965 | van de Graaff | 310/40 |
| 3,274,526 | 9/1966 | Emanuelson | 336/60 |
| 3,505,608 | 4/1970 | Enge | 328/233 |
| 3,568,035 | 3/1971 | Pierson | 363/61 |
| 3,611,032 | 10/1971 | Skillicorn | 361/35 |
| 3,781,639 | 12/1973 | Peschel | 363/61 |
| 4,338,657 | 7/1982 | Lisin et al. | 363/68 |
| 4,559,590 | 12/1985 | Davidson | 363/21 |
| 4,587,606 | 5/1986 | Sanada | 363/68 |
| 4,777,406 | 10/1988 | Ross et al. | 315/3.5 |
| 4,807,105 | 2/1989 | Varjasi et al. | 363/68 |

OTHER PUBLICATIONS

Handbook of Rectifier Circuits, Scoles, G. J., Ellis Horwood Limited, Chichester, pp. 192–195.

Primary Examiner—Peter S. Wong
Attorney, Agent, or Firm—Stanley Z. Cole; Gerald M. Fisher; Peter J. Sgarbossa

[57] ABSTRACT

A high voltage, high power DC power supply includes a single turn primary winding driven through a resonating capacitor by an AC source having a frequency in excess of about 100 kHz. The primary winding includes a pair of concentric cylindrical metal walls having opposite ends electrically connected to each other. A volume between the walls includes plural secondary winding assemblies, having different axial positions along the walls. Each of the assemblies includes an annular magnetic core surrounding the interior wall, a winding on the core and a voltage doubler rectifier. DC voltages developed across each secondary winding assembly by the rectifier are added together to provide the high voltage, high power output. The power supply energizes an X-ray tube having a grounded anode and a cathode at a DC voltage of approximately −150 kV, with a power requirement of between 15 and 60 kW. The power supply and X-ray tube are mounted on a rotatable gantry including a slip ring assembly for coupling a relatively low voltage excitation source to the power supply.

67 Claims, 7 Drawing Sheets

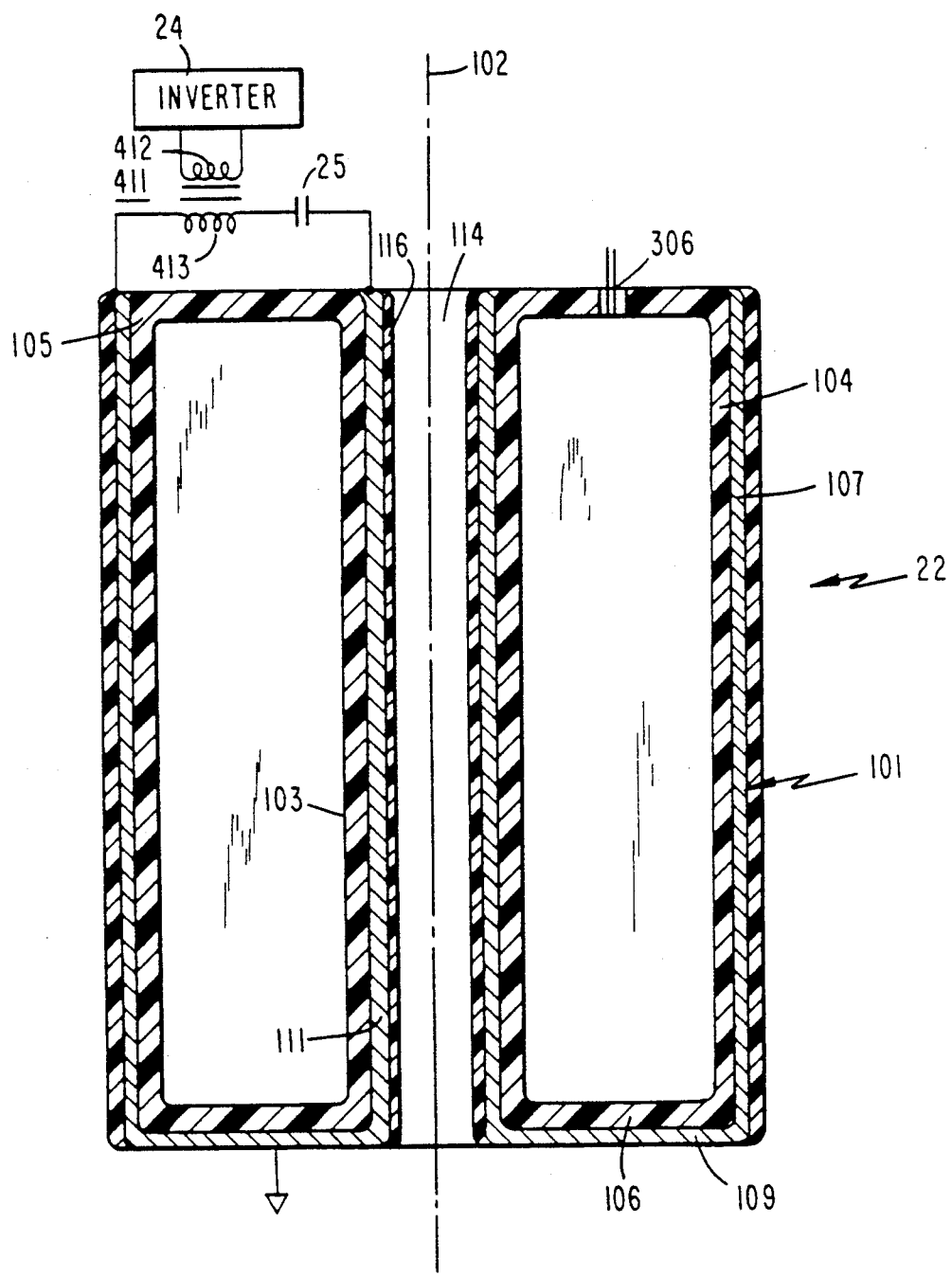

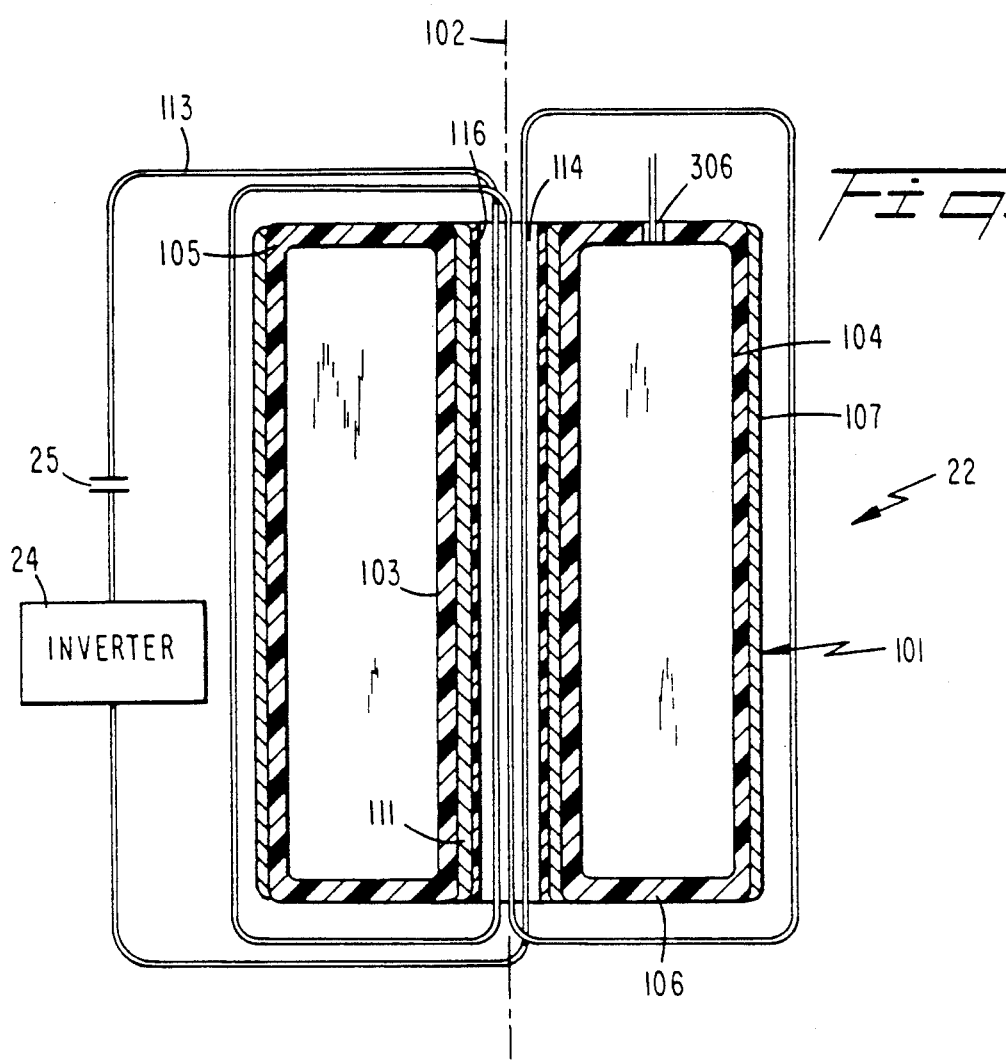
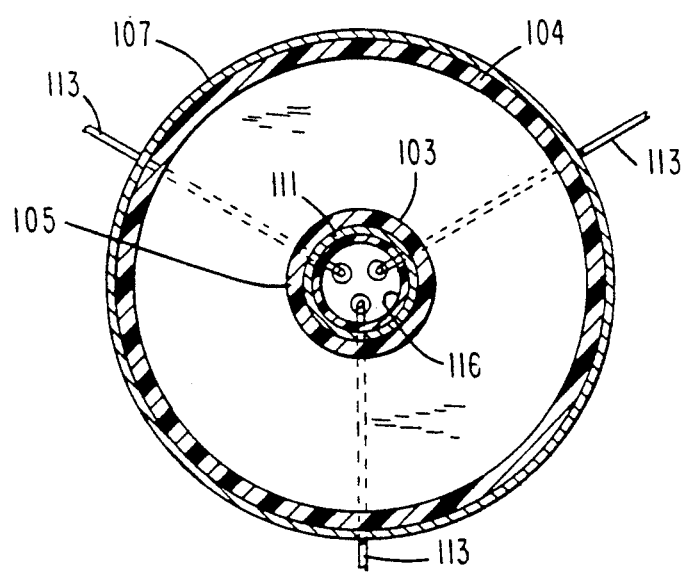

HIGH VOLTAGE HIGH POWER DC POWER SUPPLY

RELATION TO CO-PENDING APPLICATION

The present application is a continuation-in-part of my co-pending application Ser. No. 07/441,099, having the same title, filed Nov. 24, 1989, now abandoned.

FIELD OF INVENTION

The present invention relates generally to high voltage, high power DC power supplies and more particularly to a power supply having a transformer with a primary formed of a pair of metal walls having only smooth, curved surfaces driven by an AC source having a frequency in excess of about 100kHz via a resonating capacitor and wherein a volume between the walls includes plural secondary winding modules or assemblies, each including a rectifier for developing a portion of the high voltage of the supply. In accordance with another aspect of the invention, a secondary winding module includes a housing with a cylindrical wall having a metal surface between a pair of end faces with metal surfaces, wherein an annular magnetic core is located between the end faces concentrically with the cylindrical wall, and on which is wound a torroidal winding having opposite ends connected to capacitors and diodes which are also connected to the metal surfaces on the end faces. In accordance with still another aspect of the invention, an X-ray tube assembly includes a rotatable gantry on which are mounted a power supply of the aforementioned type, slip ring assembly for connecting a relatively low voltage excitation source to the power supply and an X-ray tube having a grounded anode with a cathode at a voltage of approximately −150kV, with power requirements between 15 and 60kW.

BACKGROUND ART

The desiderata for a commercial high voltage, high power DC power supply are the universal commercial requirements of relatively low cost, small volume and weight, high reliability, safety, as well as ease of repair and manufacture. In general, prior art high voltage, high power DC power supplies have not met all of these goals.

This is particularly true for power supplies having voltage ratings in excess of 50kV and power ratings between 15kW and 60kW. With the typical prior art high voltage, high power DC power supplies, volume increases as a geometric function of voltage and power.

The conventional, prior art power supplies which have attempted to achieve the aforementioned voltage and power requirements are generally classified as (a) voltage multipliers, (b) layer wound high voltage transformers having high step-up ratios which directly drive a rectifier, and (c) hybrid combinations of the voltage multipliers and layer wound high voltage transformers.

Voltage multipliers include a transformer having a step-up secondary transformer for driving several voltage rectifying and multiplying stages, each of which includes plural capacitors, and plural diodes. The transformer has a primary winding driven by an AC source, typically having a voltage on the order of several hundred volts. To achieve an output voltage of, for example, 150kV, a prohibitive number of stages is required. The DC voltage derived from such multipliers has high ripple content, as well as poor regulation. The series capacitors must have large values, therefore are costly and physically large. The large capacitors store a large amount of energy which tends to be harmful to the power supply, its load, and personnel. The stored energy is particularly harmful while a load, such as an X-ray tube, is arcing.

The connections of the prior art multipliers require all stages to be in proper operating condition to obtain an output voltage. To derive control signals for an inverter that drives the multiplier a high voltage divider must be employed The voltage across each multiplier stage differs, so that the voltage from one stage cannot be used as a sample for control of the inverter.

In a typical converter including a layer wound transformer, an AC voltage of several hundred volts is applied to a primary winding of a transformer. The transformer typically must have a turns ratio on the order of 500 to 1 to achieve a DC output voltage on the order of 150kV. The AC input to such a transformer cannot exceed a few kHz because the transformer has substantial parasitic reactances, in the form of a large series leakage inductance and large shunt winding capacitances. The series leakage inductance and shunt capacitances form a low pass filter that causes the frequency supplied to the transformer to be relatively low. Low frequency operation usually requires large filters to smooth DC voltages resulting from rectification of the transformer output. The filters employ cores having large cross-sectional areas. Hence, such transformers are usually large and heavy and are not well suited to be mounted on a rotary gantry carrying an X-ray tube having high voltage and high power requirements.

The windings of such a transformer require a large window area due to dielectric constraints for creep and puncture effects. (The creep effect is the tendency for a breakdown to occur along the surface of a conductor as a result of a voltage difference subsisting at different locations along the length of a surface, while the puncture effect is a breakdown that occurs transversely of two surfaces at differing potentials.) Dielectric constraints force the use of transformers having large magnetic cores, which are not usually available in ferrite materials. Parasitic reactances of the transformer can also adversely affect components of a power inverter used to derive the AC which is supplied to the transformer primary winding. The leakage inductance of such a transformer stores sufficient energy to threaten semiconductor switches of the inverter.

If the frequency applied to such a transformer is in excess of a few kHz, the capacitance in the secondary winding circuit of such a transformer, as reflected to the primary winding of the transformer, is virtually a short circuit for the inverter connected to drive the primary winding. This is because the secondary capacitance is reflected to the primary winding by a multiplication factor equal to the square of the 500 to 1 turns ratio, so that, for example, a 100 picofarad parasitic capacitance in the secondary winding is reflected to the primary winding as a 25 microfarad capacitance. If the AC source driving the primary winding has a voltage of 300 volts and a frequency of 20kHz, the reflected parasitic capacitance would draw 942 amperes, approximately six times the current drawn by a 40kW load. Multilayer, high turns ratio transformers also, in many instances, have very high ratios of AC to DC resistance, resulting in very high power ($I^2R$) secondary winding losses.

A structure which is a combination of the voltage multiplier structure and the layer wound transformer structure is known as a hybrid multiplier/transformer structure. Such a structure includes a central primary winding and multiple concentric secondary windings at different radii from the primary winding. Each secondary winding includes a first terminal connected to opposite polarity electrodes of a pair of series connected diodes and a second terminal connected to a common connection of first and second series connected capacitors. A DC voltage is developed across the remaining electrodes of the diodes and capacitors. Several of these units are stacked together to develop the desired high DC output voltage.

The hybrid multiplier/transformer structure is an optimal use of a layer wound high voltage transformer. The hybrid multiplier/transformer minimizes AC stress on the transformer secondary windings because layer to layer stress within the transformer is only the different DC voltages between the stacked units. In addition, the hybrid multiplier/transformer structure solves some of the previously described capacitive problems.

Because the hybrid multiplier/transformer includes a central primary winding and plural concentric secondary windings some of the high voltage secondary windings are somewhat remote from the primary windings. There is less magnetic coupling between the remote secondary windings and the primary winding than between the primary winding and secondary windings proximate the primary winding. In consequence, the voltage and power contributions of the outer windings are reduced. The hybrid multiplier/transformer arrangements are impractical for high power and high step-up ratios, such as are required to achieve DC voltages of 150kV at powers between 15 and 60kW.

It is, accordingly, an object of the present invention to provide a new and improved high voltage, high power DC power supply having relatively small size, weight and cost.

Another object of the invention is to provide a new and improved high voltage, high power DC power supply, which can be effectively energized by an AC source having a frequency in excess of about 100kHz.

An additional object of the invention is to provide a new and improved high voltage, high power DC power supply having a DC output with low ripple and which achieves its rated voltage and power relatively quickly, e.g., in less than 100 microseconds.

A further object of the invention is to provide a new and improved high voltage, high power DC power supply having relatively low stored energy, thereby leading to increased personnel and equipment safety.

An additional object of the invention is to provide a new and improved high voltage, high power DC power supply having a relatively wide bandwidth.

Still a further object of the invention is to provide a new and improved high voltage, high power DC power supply having predictable and controlled electric field stresses.

Still another object of the invention is to provide a new and improved high voltage, high power DC power supply having relatively small primary to secondary capacitance, so that in response to load arcing there is a reduced threat to components, particularly switches, of an inverter which energizes the supply with high frequency AC (in excess of about 100kHz).

An additional object of the invention is to provide a new and improved high voltage, high power DC power supply that is arc tolerant as a result of AC and DC high voltage grading along the length of the supply remaining the same during load arcs.

Still an additional object of the invention is to provide a new and improved high voltage, high power DC power supply having reduced electromagnetic interference.

A further object of the invention is to provide a new and improved high voltage, high power DC power supply that is relatively easy to manufacture and maintain, and wherein a failure of one section of the power supply does not result in the complete inoperability of the entire supply.

To achieve the power requirements for an X-ray tube mounted on a rotating gantry for CT scanning applications, i.e., a 150kV difference between the tube anode and cathode at powers between 15 to 60kW, the prior art has employed a floor mounted structure for deriving a pair of 75kV outputs. The outputs of the structure maintain the cathode at −75kV and the anode at +75kV. Connections from the structure to the tube anode and cathode electrodes are via high voltage slip ring assembly on the rotating gantry. High voltage slip ring assemblies are expensive, awkward, difficult to design, have questionable reliability and are intermittent due to arcs. The only prior art X-ray power supply of which I am aware that is mounted on a rotating gantry employs an inverter using high voltage asymmetrical silicon controlled rectifiers, currently available from only a single source.

The stored energy of a prior art power supply for gantry mounted X-ray tubes is on the order of 30 joules, resulting in large electric field stresses on the components in the power supply. The geometry to achieve this prior art power supply is difficult to reproduce, and results in high voltage gradients. This prior art power supply employs solid, potted dielectrics which are difficult to control in manufacture, and are susceptible to voids, corona failure, and cannot be repaired. Other parts of the prior art devices are also difficult to manufacture and repair. In addition, the time required for the prior art device to achieve full voltage is relatively great, being approximately 5 milliseconds.

The prior art device has poor tolerance to arcs which occur as a result of X-ray tube discharges. Typically, the voltage is not divided equally during an arc, with the highest voltage stages having a considerably larger percentage of the arc voltage developed across them than the lower voltage stages. Poor arc tolerance also occurs as a result of strong capacitive coupling between the primary and secondary windings. It is not possible to develop 150kV with a single prior art power supply because of limitations of potting and the requirements for a great number of multiplier stages. Control logic of the prior art device is relatively complex, requiring digital control of a voltage controlled oscillator loop for bridge selection and frequency adjustment to control the supply DC output.

The prior art power supplies have large shunt filter capacitors; some also have cables with significant shunt capacitance. The resulting large shunt capacitance results in an appreciable time for the voltage of the supply to be reduced from the rated value to zero volts. This has an adverse effect on human and X-ray tube safety.

Temperature variations of the prior art supply can result in the dielectric potting becoming cracked and can create gaps or voids at component surfaces, resulting in corona discharge and failure of the supply and possibly of the tube connected to it.

While the size and weight problems can be reduced by providing a power supply having a transformer driven by a high frequency source, the typical prior art approaches to high frequency have not been effective for the high voltage, high power application because of the high parasitic capacitance reflected from the secondary winding to the primary winding. In a high voltage power supply, there is an additional constraint imposed by dielectric strength and derating of materials, i.e., many materials that are rated for a certain voltage cannot be used for that voltage (many materials rated for 100kV are not used in greater than 10kV environments.) In high voltage transformers, size is frequently determined by puncture and creep considerations, rather than by thermal or flux density limitations.

My analysis indicates that the problem in size and weight reduction in high voltage, high power power supplies must be solved by using a system having low dielectric stress, increased operating frequency (in excess of about 100kHz) and a high bandwidth step-up transformation device permitting the use of high frequencies. It is, for example, desirable for the converter, including a power control feedback loop, to have a bandwidth approaching 20kHz. In addition, it is desirable, in certain situations, for a high voltage, high power power supply to be driven by portable power generating devices, such as a pair of automotive batteries connected in series. It is also desirable for the ripple of the high voltage derived by the supply to be relatively low. Low frequency ripple is essential. For the X-ray application, high frequency ripple, in excess of about 200kHz, can be tolerated to a certain extent.

Apparently, one reason for the slow acceptance of grounded anode X-ray tubes has been the unavailability of a −150kV power supply, in combination with the requirement for a filament power supply for the X-ray cathode that floats at the −150kV level.

It is, accordingly, another object of the present invention to provide a new and improved X-ray assembly that is capable of supplying a cathode of an X-ray tube used for CT applications with a voltage of −150kV, while simultaneously supplying current to a filament for the cathode at a voltage that floats at approximately the same voltage as the cathode.

Another object of the invention is to provide a new and improved X-ray tube assembly wherein a rotating gantry carries an X-ray tube for CT applications, as well as the high power, high voltage power supply for the X-ray tube and a slip ring assembly for supplying relatively low voltage excitation to the power supply.

It is still a further object of the invention to provide a new and improved module or assembly for a high voltage, high power DC power supply, which module develops a portion of the DC voltage derived by the supply, while assisting in minimizing the cost, weight, as well as size of the supply, and contributing to safety enhancement as well as ease of manufacture and repair.

THE INVENTION

In accordance with one aspect of the invention, a high voltage, high power DC power supply comprises an AC source having a frequency in excess of about 100kHz, in combination with a transformer having a single turn primary winding and plural secondary winding assemblies. The primary winding includes a first metal cylindrical wall having a longitudinal axis and a second metal wall surrounding the first metal wall. The second wall is a shield and has only continuously curved surfaces in proximity to the first wall. The first and second walls have adjacent ends that are electrically connected to each other so that they are at the same electric potential.

Each of the secondary winding assemblies is magnetically coupled to the primary winding and has a different axial position relative to the length of the first wall and is in a volume between the first and second walls. Each of the assemblies includes a magnetic core having a circular inner diameter coaxial with the first wall and an outer diameter having only continuously curved surfaces. A winding is wound about each of the cores. Rectifier means connected to the winding of each of the assemblies develops a portion of the total high DC voltage produced by the supply. To provide the spacing necessary for high voltage insulation the spacings from the inner wall to the inner diameter and from the outer diameter to the outer wall are such that the windings of the secondary assemblies are loosely coupled to the primary winding. Normally such a large spacing would be a problem and result in large leakage inductances. Because of the single turn primary winding and the arrangement of the plural secondary winding assemblies, the parasitic inductance of the secondary winding assemblies is reflected to the primary winding as a low leakage inductance. The assemblies are connected together to add the developed voltages together to produce the high voltage. A capacitor connected in series with the primary winding resonates the transformer with the source.

In accordance with another aspect of the invention, a secondary winding assembly for an AC to high voltage DC converter is provided. The assembly develops a portion of the converter high DC output voltage. A plurality of the assemblies are adapted to be (a) connected together to develop the converter high DC output voltage and (b) located concentrically with and between interior and exterior metal cylindrical walls of a primary winding of a transformer included in the converter. The assembly includes a generally annular non-magnetic housing adapted to be concentric with the interior wall. The housing includes a cylindrical wall segment with a metal surface coaxial with the interior cylindrical wall. The housing extends in the axial cylindrical wall segment direction of the interior wall of the primary winding. First and second end faces extend from and are at right angles to the wall of the assembly. Each of the end faces includes a metal surface, arranged so that a portion of the high voltage DC is developed across them. An annular magnetic core, included in and coaxial with the housing, has a torroidal coil wound on it. The first and second capacitors connected between the metal surfaces are arranged so that first and second electrodes of the capacitors are respectively at the potentials of the metal surfaces of the first and second end faces and other electrodes of the capacitors are connected to a first terminal of the coil. First and second diodes connected between the metal surfaces are arranged so that first and second electrodes of the diodes are respectively at the potentials of the metal surfaces of the first and second end faces and other electrodes of the diodes are connected to a second terminal of the coil.

In accordance with still another aspect of the invention, a transformer for a high voltage, high power DC power supply comprises a first metal cylindrical wall having a longitudinal axis and a second metal wall surrounding the first metal wall and having only curved surfaces in proximity to the first wall. Plural secondary winding assemblies are magnetically coupled to the primary winding. Each of the assemblies has a different axial position relative to the length of the first wall and is in a volume between the first and second walls. Each of the assemblies includes a magnetic core having a circular inner diameter coaxial with the first wall and an outer diameter having only curved surfaces. A torroidal winding is wound about each of the cores. The spacing from the inner wall to the inner diameter and from the outer diameter to the outer wall are such that the windings of the secondary assemblies are loosely coupled to the primary winding.

In accordance with still another aspect of the invention, an X-ray tube assembly comprises a rotatable gantry on which are mounted (a) an X-ray tube, (b) at least a portion of a high voltage DC power supply for anode-cathode electrodes of the X-ray tube, and (c) a slip ring assembly for feeding a relatively low voltage from an excitation source to the portion of the high voltage power supply on the gantry. The supply includes an AC source having a frequency of at least about 100kHz. The portion of the high voltage power supply on the gantry includes a transformer having a single turn primary winding responsive to the source. The primary winding includes a metal cylindrical wall having a longitudinal axis and a second metal wall surrounding the first wall. Corresponding parts of the two metal walls are connected together so they are at the same voltage. Each of plural secondary winding assemblies magnetically coupled to the primary winding has a different axial position relative to the length of the first wall and is in a volume between the first and second walls. Each of the assemblies includes a magnetic core having a circular inner diameter coaxial with the first wall and an outer diameter having only curved surfaces. Rectifier means connected to a winding wound about each of the cores of each of the assemblies develops a portion of the derived DC voltage by the supply. The spacing from the inner wall to the inner diameter and from the outer diameter to the outer wall is such that the windings of the secondary assemblies are loosely coupled to the primary winding. The rectifier means of the assemblies are connected so the developed voltages are added together. A capacitor connected in series with the primary winding has a value for approximately resonating the transformer to the AC source.

In accordance with still a further aspect of the invention, an X-ray tube assembly comprises a rotatable gantry on which are mounted: (a) an X-ray tube having a power requirement of between 15 and 60kW, a grounded anode, a cathode at a negative voltage of about 150kV, (b) at least a portion of a high voltage power supply connected to the anode and cathode for satisfying the tube cathode voltage and power requirements, and (c) a slip ring assembly for supplying excitation to the power supply from a relatively low voltage source off of the gantry. The portion of the high voltage power supply on the gantry includes a transformer having a low voltage primary winding responsive to the AC source and several secondary windings having rectifiers connected to them. The rectifiers are connected together to derive the −150kV voltage that is supplied to the cathode.

Because the present invention preferably employs an AC excitation voltage of at least about 100kHz, the size and weight, therefore, cost, of the supply are considerably reduced. The high frequency can be achieved because the supply is divided into several stages or assemblies to minimize the effective secondary-to-primary turns ratio of the entire device. In addition, the capacitance of each stage or assembly is relatively small, a result achieved by forming each of the torroidal windings as a single layer with a minimum number of turns and winding capacitance. Because all of the secondary winding assemblies are in series with each other, the total capacitance effect is reduced. While the reflected inductive load of each secondary winding stage is relatively large because of the fairly large spacing between the magnetic core and winding of each assembly and the metal, interior cylindrical wall of the transformer, the resonating capacitor balances out this inductive load. The resonating capacitor in series with the primary winding also provides an optimum power transfer between the low voltage, high frequency excitation source and the load driven by the high voltage power supply. Because the present invention employs a single turn primary winding that is coaxial with the secondary winding assemblies the leakage inductance between the secondary winding assemblies and the primary winding is not particularly large.

Because the supply of the present invention is operated in a continuous mode at a high frequency in excess of about 100kHz, it has excellent ripple performance and only a few joules (2–3) of stored energy. Ripple as low as one percent can be achieved with no added filtering beyond the capacitors of each voltage doubler in each secondary winding assembly. Hence, the power supply of the present invention is relatively safe, causes minimum damage to a load at the time of load arcing, has a relatively low level of electromagnetic interference so other circuitry in the vicinity of the power supply is not corrupted in response to an arc, and minimum damage occurs to the power supply itself in response to an arc. The combination of low stored energy, a low degree of parasitic capacitance and inductance and high frequency operation enable the present invention to achieve rise times of approximately 80 microseconds. In addition, the voltage of the supply can drop to a zero level considerably faster than the typical prior art devices.

Because of the wide bandwidth of the device, resulting from the high frequency operation, which results in low capacitance on the DC side, the power supply can be used as a plate supply for an AM transmitter. In such an instance, a modulating voltage is applied to a controller in a feedback loop that is responsive to the voltage of the supply and a frequency control input of the inverter driving the supply Because of the stacked relationship of the different secondary modules, if one fails, the voltage of the entire supply is apparently reduced only by the decrease in voltage of the failed module. The use of different modules also enables the DC voltage of the entire supply to be monitored in response to the DC voltage across a single module or secondary winding assembly.

Minimal capacitance between the secondary winding assemblies and the primary winding is achieved because of the relatively large spacing between the primary winding and the windings of the secondary winding assemblies. Conventional layer wound transformers have large capacitances between the primary and secondary windings. During an arc, these capacitors inject large currents into the primary, often destroying components in the current path; e.g., in the inverter driving the primary. In the present invention, there are relatively small surfaces between the primary winding and the secondary winding assemblies, as well as large distances between the primary winding and the secondary winding assemblies. The material in the volume between the primary winding and the secondary winding has a relatively low dielectric constant, such as oil and solids having a dielectric constant of approximately 2.2, to maintain the capacitance between the primary and secondary at a relatively low level. This structure eliminates shields often used to protect electronic circuits connected to the primary winding. Such prior art shields are costly, cause increased capacitance to be reflected to the primary winding and can result in large losses due to circulating currents.

All of the secondary winding assemblies of the present invention have the same construction, leading to decreased cost. The same DC voltage is developed by each secondary winding assembly. Coupling between each of the secondary winding assemblies and the single turn primary winding is the same. In response to an arc produced by the load, the arc voltage divides evenly amongst the secondary winding assemblies. This is in contrast to conventional transformers wherein the transmission line behavior is such that frequently considerably more than 20% of the voltage is developed across the upper 20% of the turns during transient conditions such as an arc.

In the preferred embodiment, the two walls of the primary winding are cylindrical and concentric to each other. Each of the secondary winding assemblies is also concentric with these walls. By employing a structure having cylindrical symmetry, field stress is reduced to a minimum and can be calculated and planned in the design stage. Predictable electric field stresses on the dielectric can be calculated in accordance with:

$$E = \frac{V}{r_i \ln\left(\frac{r_o}{r_i}\right)}$$

where
is the electric field stress,
V equals the voltage between the concentric cylinders
$r_i$ is the radius of an interior cylinder, and
$r_o$ is the radius of the exterior cylinder.

The electric field stress is optimized if $$\left(\frac{r_o}{r_i}\right)$$

equals the base of natural logarithms. Because of this predictability, enhanced reliability of the high voltage section is achieved The cylindrical symmetry of the structure avoids rectangular bits and pieces with points and edges, having stress increases that can result in localized fields which are two to ten times the average electric field. Such stress increases cannot be tolerated when size and weight are to be minimized.

BRIEF DESCRIPTION OF THE DRAWING

FIG. 3A is a cross-sectional view of a first embodiment of a tank in which are located plural secondary winding assemblies and certain electrical connections to the tank;
FIG. 3B is a cross-sectional view of a second embodiment of a tank and electrical connections to the tank;
FIG. 4 is a sectional view of the tank illustrated in FIG. 3.

DESCRIPTION OF THE PREFERRED EMBODIMENTS

Figure 1:
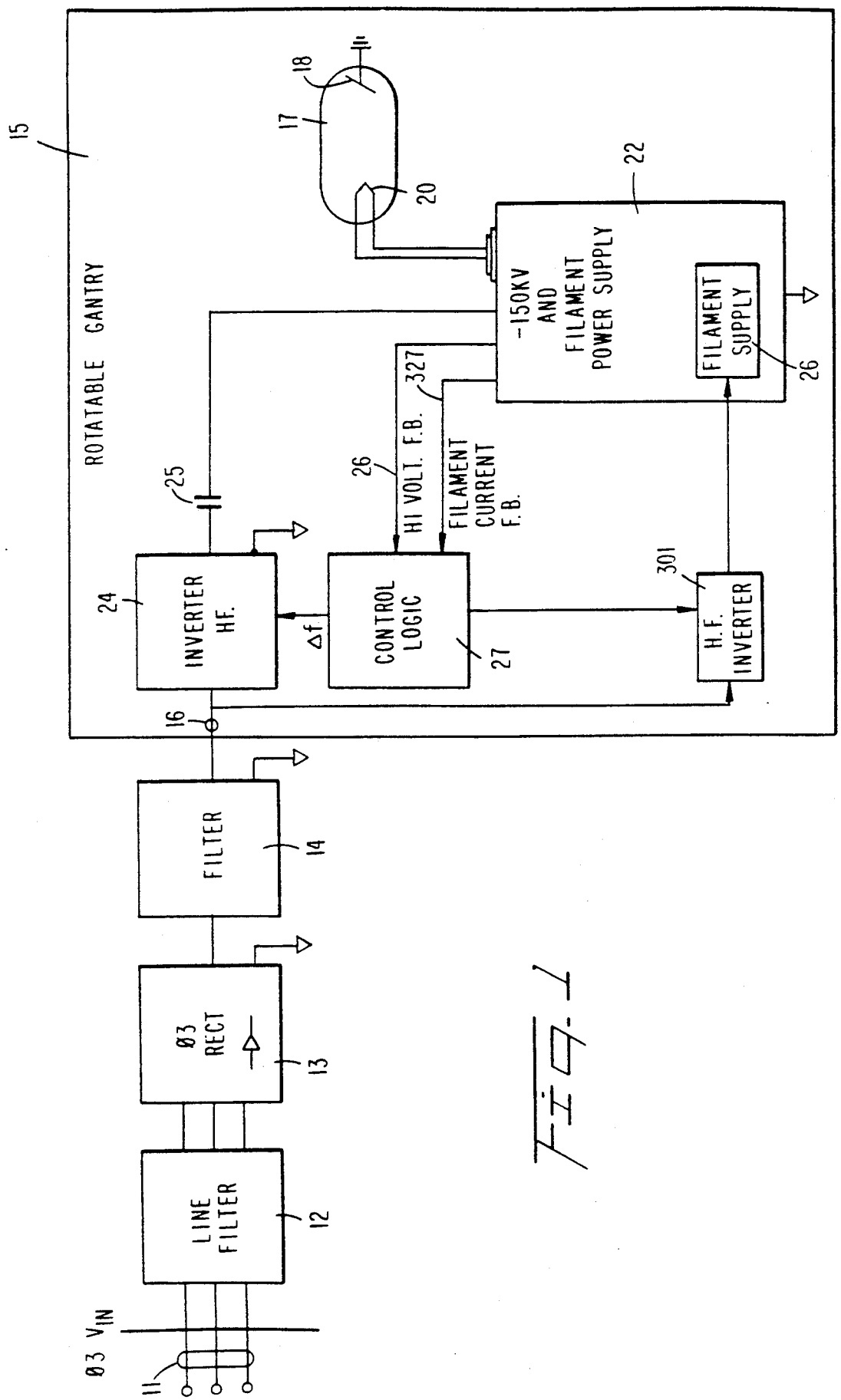
FIG. 1 is a system block diagram of a preferred embodiment of the invention.

Reference is now made to FIG. 1 of the drawing, a block diagram of a CT scanner X-ray tube and power supply therefor. The power supply is responsive to a three-phase AC source from three-phase mains 11, typically at 208 or 440 volts, 50 or 60 Hertz. Three-phase mains 11 are connected to AC line filter 12 for supplying a three-phase AC input to three-phase rectifier 13. Three-phase rectifier 13 supplies a DC output to filter 14 for deriving a DC output voltage of, for example, 300 volts.

Filters 12 and 14 and rectifier 13 are fixedly mounted and supply relatively low voltage excitation to CT scanner X-ray tube power supply 22 on rotatable gantry 15 via low voltage slip ring assembly 16, also carried by the gantry. Gantry 15 also carries X-ray tube 17, having grounded, rotating anode 18 and filament 20 which functions as a cathode, i.e. is an electron emitter. Typically, the filament is maintained at −150kV DC.

The excitation voltage and current for filament 20 are derived from −150kV DC supply and filament power supply 22, configured as a high voltage cylindrical tank. In the preferred embodiment for a 150kV, 60kW source, the high voltage cylindrical tank has a diameter of approximately 9 inches and a height of approximately 30 inches; the tank and its contents weight about 150 pounds. If a pair of power supplies are employed such that one power supply energizes the filament to −75kV and a second power supply energizes the anode to +75kV each tank has a diameter of about 6.4 inches and a height of about 22 inches. Power supply 22 feeds varying amounts of power to the path between filament 20 and anode 18. For the CT scanner application, the power varies between 15kW and 60kW, depending on the nature of the object being irradiated by the X-ray beam derived from tube 17.

Power supply 22 is energized by an AC output of high frequency inverter 24, driven by the DC output of filter 14 via slip ring assembly 16. Inverter 24, preferably including field effect transistor switches, is of the variable frequency type, so that the inverter output voltage and frequency are inversely related. Since the filament-anode path of X-ray tube 17 is a constant current load the inverter output power and frequency are also inversely related. Inverter 24 is of the type generally known in the art as a continuous mode series resonant converter on the inductive side. Inverter 24 derives a high frequency, in excess of about 100kHz, preferably between about 130kHz and 180kHz, relatively high output power AC wave having a voltage on the order of 300 volts.

The AC output of inverter 24 is coupled through resonating capacitor 25 to the input of power supply 22. The value of capacitor 25 is selected so that there is an approximately series resonant circuit for the frequency derived by inverter 24. The resonant circuit is formed by capacitor 25, in combination with the inductance of power supply 22, as reflected to a single turn primary winding of a transformer of supply 22; the primary winding and capacitor 25 are series connected with each other. The resonant frequency of the circuit including capacitor 25 and the inductance in series therewith, as determined inter alia by the reflected secondary inductance of the transformer in supply 22, is somewhat less than the frequency derived from inverter 24. Thereby, variations in the frequency of inverter 24 cause the output voltage and power of supply 22 to be changed.

Control for the frequency of inverter 24 and the current supplied by supply 22 to filament 20 are in response to monitored values of the output voltage and current of supply 22. To these ends, a high voltage feedback signal indicative of the voltage output of supply 22 is coupled by lead 26 to control logic network 27, preferably of the analog type. Network 27 responds to the signal on lead 26 to supply a frequency control input signal to inverter 24. A filament current feedback signal on lead 327, indicative of the DC output current of supply 22, is coupled to network 27, which in turn supplies a control signal to inverter 301 for control of the current amplitude applied to filament 19.

In the preferred embodiment, rotatable gantry 15 carries inverter 24, control logic circuit 27, power supply 22 and X-ray tube 17. In such a configuration, only a single slip ring assembly 16 is required to feed the low voltage output of filter 14 in parallel to inverters 24 and 28. Alternatively, gantry 15 carries only supply 22 and tube 17, in which case a slip ring assembly is provided between the relatively low output voltage of inverter 24 and the signal from power supply 22 to control logic network 27. As a further alternative, line filter 12, three-phase rectifier 13 and filter 14 are mounted on gantry 15 with the remainder of the power supply. This alternative arrangement requires only a single low voltage slip ring assembly, but requires mounting of relatively large filters 12 and 14 and rectifier 13 on the gantry. Such mounting may be advantageous to assist in balancing the weight of X-ray tube 17.

Figure 2:
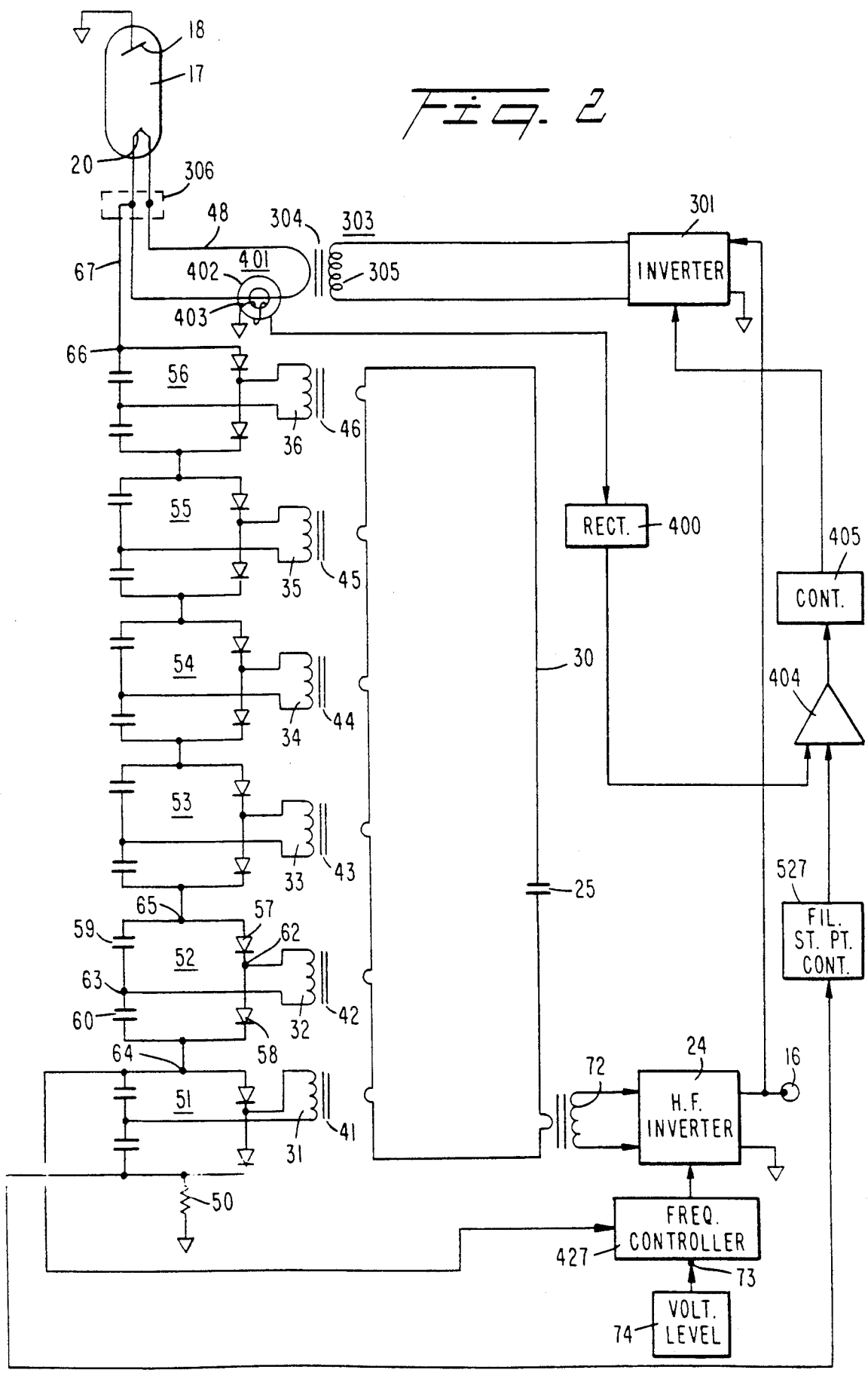
FIG. 2 is a circuit diagram of a portion of the apparatus illustrated in FIG. 1.

Reference is now made to FIG. 2 of the drawing, a circuit diagram of the components in power supply 22 and the circuitry directly connected to it. Power supply 22 includes single turn primary winding 30 coupled to torroidal coil secondary windings 31–36 by ferrite annular cores 41–46. Connected across opposite terminals of secondary windings 31–36 are voltage doubling rectifiers 51–56, respectively. Each of voltage doubling rectifiers 51–56 includes a pair of series connected diodes and a pair of series connected capacitors.

In the following description, the connections of components 57–60 of rectifier 52 are described. It is to be understood, however, that identical connections subsist for the diodes and cathodes of the remaining rectifiers. The cathode of diode 57 and the anode of diode 58 have a common connection to a first terminal 62 of winding 32. An electrode of each of capacitors 59 and 60 has a common connection to a second terminal 63 of winding 32. The remaining electrode of capacitor 60 and the cathode of diode 58 are connected together at terminal 64, while the remaining electrode of capacitor 59 and the anode of diode 57 have a common connection to terminal 65. In the actual power supply having an output voltage of −150kV, the number of turns of winding 32 and the arrangement of components 57–60 are such that the DC potential at terminal 65 is 25kV below the DC potential at terminal 64. In a similar manner, a voltage of −25kV is established across each of the rectifiers connected across the six secondary windings. The rectifiers are connected together so that the DC voltage at terminal 66 of the highest voltage rectifier is approximately −150kV relative to ground. The voltages developed across each of rectifiers 52–56 are added together by stacking the rectifiers, i.e., connecting the different rectifiers in series with each other.

The steady state current supplied to filament 20 is a function of the DC current of power supply 22. To these ends, the DC current of power supply 22 is monitored by connecting fixed resistor 50 in series with rectifier 51 and monitoring the voltage across resistor 50. The voltage across resistor 50 determines the steady state amplitude of AC current, at a frequency of approximately 50kHz, that is supplied to filament 20. The 50kHz AC voltage is derived by supplying the DC voltage at slip ring assembly 16 to inverter 301, having a 50kHz output. The output of inverter 301 is dynamically controlled by comparing the current supplied by the inverter to filament 20 with the desired steady state value therefor, as derived from control circuit 27 in a known manner.

Inverter 302 supplies a variable amplitude current to transformer 303, including ferrite core 304 on which is wound primary winding 305, connected to the output terminals of controller 302. High voltage wire 48 is threaded through the aperture of ferrite core 304, to function as the secondary winding of transformer 303. Opposite end terminals of wire 48 are connected by high voltage connector 306 to filament 20. One of the pins of connector 306 is connected to the −150kV voltage at terminal 66 by lead wire 67 so that filament 20 floats at −150kV DC.

Dynamic control of the current supplied by inverter 301 to filament 20 is provided by monitoring the current supplied by the inverter to primary winding 305 of transformer 303, and by comparing the monitored current with the desired or set point value for the current, as derived by filament set point control network 527 of control logic circuit 27. The current supplied by inverter 301 to transformer 303 is monitored with current transformer 401, including ferrite core 402 having an aperture through which is threaded lead 48. Multi-turn secondary winding 403 is wound on core 402 to derive a voltage proportional to the current supplied by inverter 301 to filament 20. The voltage derived across secondary winding 403 is supplied via rectifying network 400 to one input of difference amplifier 404, having a second input responsive to the output of controller 527 indicative of the set point value for the current of filament 20. Amplifier 404 derives an error signal indicative of the amplitude of the difference of the two inputs thereof. The error signal is supplied to controller 405 which controls inverter 301 in such a manner that the current supplied by the inverter to winding 305 causes filament 20 to derive a current determined by the current set point output of control logic circuit 27.

In operation the current flowing in winding 305 is transformer coupled via the step-down action of transformer 303 to lead 48, to control the current supplied by the lead to filament 20. Typically, the core of transformer 303 comprises several stacked relatively small diameter ferrite cores; in a typical configuration, the ferrite cores have an inner diameter of approximately one inch, in contrast to the approximately four inch outer diameters of ferrite cores 41-46. Several ferrite cores are stacked together to provide sufficient magnetic coupling between winding 305 and lead 48.

Primary winding 30 is driven by the high frequency output of inverter 24. Frequency controller 427 (a part of control logic circuit 27) for inverter 24 includes a set point input terminal 73 which responds to a DC voltage derived from source 74. The voltage derived from DC source 74 is set in response to an operator selecting a value commensurate with the desired output voltage of X-ray tube 17. Frequency controller 427 responds to the voltage supplied to set point input 73 thereof and to the voltage developed between terminal 64 (across the lowest voltage rectifier 51) and ground to provide a frequency control input for inverter 24. Any voltage difference between the inputs of controller 427 adjusts the frequency of inverter 24 to maintain power output of X-ray tube 17 at the desired level selected by set point input 74. As the frequency of inverter 24 increases, the output voltage of supply 22 decreases; at the maximum power of about 60kW, inverter derives a 130kHz output and supply 22 feeds about 400 milliamperes to the anode-filament path of X-ray tube 17.

The variable high frequency, high power output of inverter 24 is coupled by winding 72 to single turn primary winding 30, connected in series with resonating capacitor 25. From an equivalent circuit standpoint, the inductance of single turn primary winding 30 is in series with inductive leakage reactance coupled by each of the secondary winding assemblies associated with windings 31-36 to primary winding 30. Each of the secondary winding assemblies has sufficiently low parasitic capacitance that the overall effect thereof, as reflected from secondary windings 31-36 to single turn primary winding 30, can be ignored. This is particularly the case because the capacitances reflected from windings 31-36 to winding 30 are in series, and thus divide.

The physical structure of one embodiment of the tank for high voltage power supply is illustrated in FIG. 3A as comprising sealed cylindrical tank 101 having longitudinal axis 102. Concentric with axis 102 are interior cylindrical plastic wall 103 and exterior cylindrical plastic wall 104. Extending between walls 103 and 104 are circular plastic end faces 105 and 106 having central apertures with circumferences aligned with the inner diameter of wall 103. End faces 105 and 106 are secured to walls 103 and 104 by any suitable means to provide a seal for tank 101 between its interior and exterior walls. In a preferred embodiment, the interior volume of tank 101 between walls 103 and 104 is filled with dielectric oil, typically having a dielectric constant of 2.2, and secondary winding assemblies of the type described in connection with FIG. 2. Plastic or dielectric walls 103 and 104 and end faces 105 and 106 have approximately the same dielectric constant as the dielectric constant of the oil in tank 101 to provide uniform capacitance throughout the tank volume in the regions not occupied by the secondary winding assemblies. Alternatively, a gaseous dielectric, such as air, and the secondary winding assemblies fill the interior, sealed volume of tank 101.

Non-magnetic, metal (e.g. aluminum or copper) layers 107 and 109 are respectively coated on the exterior surfaces of wall 104 and bottom end face 106. The interior surface of wall 103 is coated with a like metal layer 111. All of layers 107, 109 and 111 are in contact with each other to form a single electric conductor which comprises single turn winding 30 of the transformer illustrated in FIG. 2. Because of the high frequency excitation applied by inverter 24 to the single turn primary winding, as described infra, there is a substantial skin effect of the current flowing in layers 107, 109 and 111 and the layers need not be particularly thick.

The single turn primary winding formed by layers 107, 109 and 111 functions as an effective electromagnetic shield. Non-magnetic metal conducting layers 107 and 109 provide electrostatic shielding between components inside of tank 101 and those outside of the tank. Magnetic shielding is also provided between the components in tank 101 and components outside of the tank because magnetic flux between the primary winding formed by layers 107, 109 and 111 and the secondary winding assemblies cannot extend beyond the current path of layer 107 on wall 104. The magnetic shielding effect of layer 107 is similar to the magnetic shielding effect of a coaxial cable shield.

In the embodiment of FIG. 3A, the high frequency output of inverter 24 is supplied to the single turn primary winding comprising layers 107, 109 and 111 via transformer 411, including primary winding 412, connected to the output of the inverter. Transformer 411 includes secondary winding 413, having a first terminal connected to exterior layer 107 and a second terminal connected to interior layer 111 via resonating capacitor 25.

An alternative structure that can be used to couple inverter 24 to the single turn primary winding comprising layers 107, 109 and 111 involves connecting one terminal of inverter 24 to the intersection of layers 107 and 108 and connecting the other terminal of the inverter to a capacitor series connected to a lead that extends through passage 114 to ground potential at the intersection of layers 109 and 111.

In the embodiment of FIG. 3B, the tank is modified so that layer 109 is removed from bottom end wall 105. High frequency current is coupled from inverter 24 to the volume in the tank between the interior and exterior cylindrical walls 103 and 104 by connecting the output of the inverter to high voltage, insulated lead wire 113 that extends at least once and preferably several times (three turns are illustrated) through passage 114 defined by dielectric coating 116 on layer 111 of tank interior wall 103.

Output terminals of inverter 24 are connected directly to lead wire 113. Wire 113 extends through passage 114, thence around the periphery of tank 101 several times as illustrated in FIGS. 3 and 4. In FIG. 4, adjacent segments of wire 113 are illustrated as radiating from passage 114 through the same angle such that there is about a 120° displacement of the radially extending portions of wire 113 across end faces 105 and 106. Resonating capacitor 25 is connected in series with wire 113.

In operation, the AC current flowing in lead 113 transfers AC magnetic flux to secondary windings 31-36. Metal layers 107 and 111 are grounded electrostatic shields. Because lead 113 extends three times through passage 114, the magnetic flux effect is essentially three times that of a single wire. Thus, the AC current in lead 113 is coupled by transformer action to secondary windings 31-36. The several turn primary winding device illustrated in FIGS. 3B and 4 generally has a lower wattage rating than the single turn primary winding device of FIG. 3A. For many applications, the volume between layers 107 and 111 in the device of FIGS. 3B and 4 is filled only with air, in which case endface 106 can be eliminated.

Figure 5:
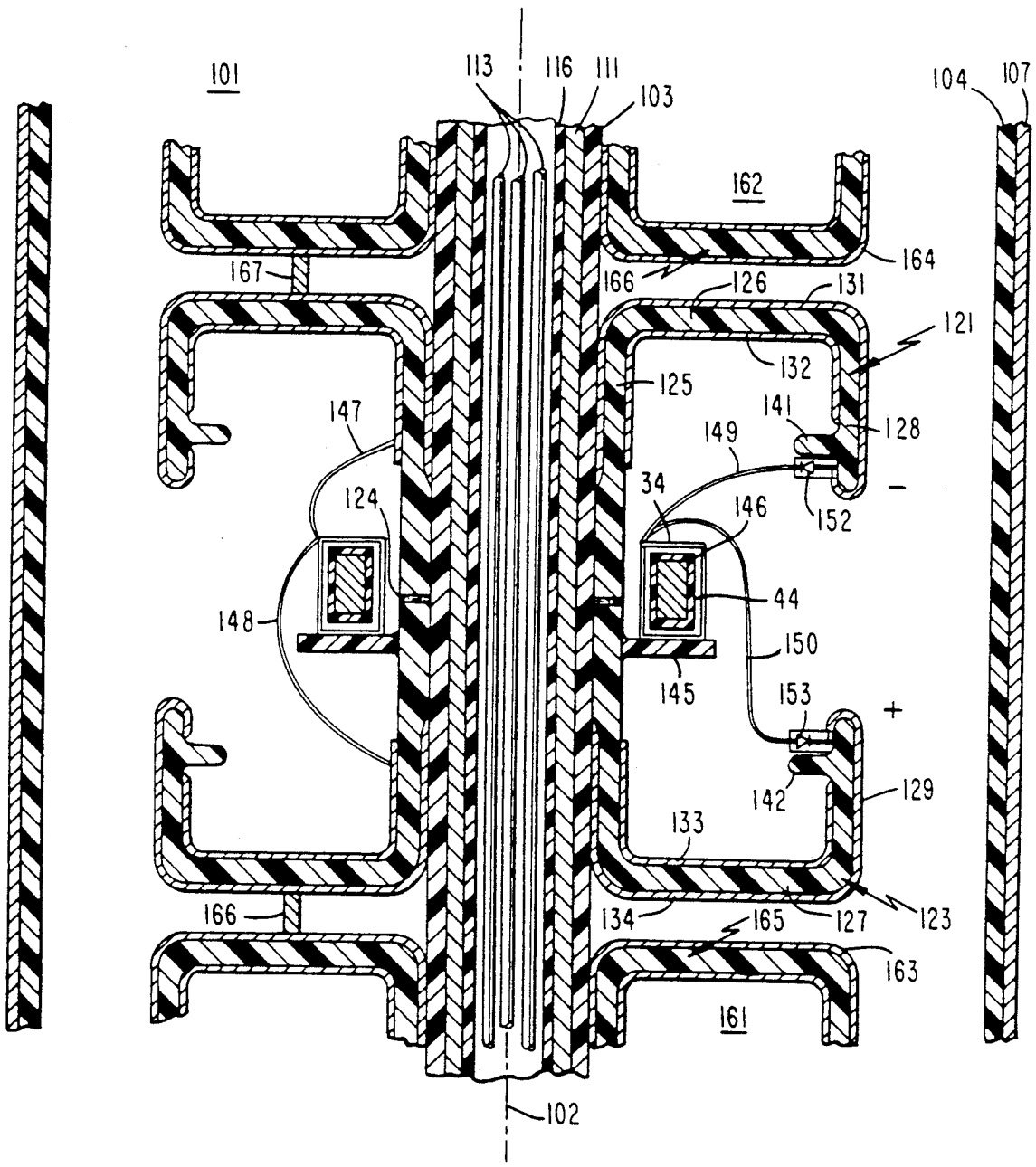
FIG. 5 is a cross-sectional view of a portion of the tank illustrated in FIG. 3, wherein there are illustrated one complete secondary winding assembly and the secondary winding assemblies immediately adjacent thereto.

Reference is now made to FIG. 5 of the drawing wherein there is illustrated a detailed cross-sectional view of a portion of the interior of tank 101. In FIG. 5 are illustrated the secondary winding assembly including winding 34, core 44 and rectifier 54, as well as the adjoining portions of the secondary winding assemblies including windings 33 and 35, cores 43 and 45 and rectifiers 53 and 55.

The assembly including coil 34, core 44 and rectifier 54 includes a generally torroidal shaped dielectric housing 121, preferably split into upper and lower segments, each formed in cross-section similar to the letter J, for ease of manufacture. Segments 122 and 123 are bonded together at joint 124 so that an elongated tubular wall 125 is formed. Wall 125 has an inner diameter approximately equal to the outer diameter of cylindrical wall 103, to which it is bonded. Housing 121 also includes annular end faces 126 and 127, extending at right angles from opposite ends of wall 125. Tubular ears 128 and 129, concentric with wall 125 and axis 102, respectively extend downwardly and upwardly from the ends of end faces 126 and 127 remote from wall 125. Flanges 141 and 142 respectively extend from the inner walls of ears 128 and 129 toward wall 125 to provide mounting ledges for diodes 152 and 153 of rectifier 54.

The junctions of wall 125 with end faces 126 and 127 and of end faces with ears 128 and 129 are all rounded to form fillets defined by 90° arcs of a radius. In addition, the free ends of ears 128 and 129 are smooth continuous curves. This prevents metal coatings which are applied to the various surfaces of wall 125, end faces 126 and 127 and ears 128 and 129 from having sharp edges which frequently lead to high electrostatic stress and cause breakdowns.

Nonmagnetic, metal layers 131-134 are coated on several of the surfaces of housing 121 to provide electrostatic shielding for winding 34 and diodes 152 and 153. In addition, metal layers 131-134, together with the dielectric of housing 121, form the capacitors of rectifier 54. To provide these effects, layers 132 and 133 are respectively coated on the bottom and top walls of end faces 126 and 127. Layers 132 and 133 extend from end faces 126 and 127 around the intersection between the end walls and ears 128 and 129 to regions slightly spaced from the top and bottom of flanges 141 and 142. Layers 132 and 133 also extend from end faces 126 and 127 at the intersection between the end walls and side wall 125 and extend toward each other on the side wall. Layers 132 and 133 are spaced from each other along the length of side wall 125 by a sufficient distance to avoid creep effects.

Layers 131 and 134 are respectively coated on the top and bottom walls of end faces 126 and 127. Layers 131 and 134 extend around the curved intersection between end faces 126 and 127 and the interior surface of wall 125. Layers 131 and 134 also extend from the outer edges of end faces 126 and 127 around the outer diameter of ears 128 and 129, thence around the rounded ends of the ears into contact with flanges 141 and 142. Flanges 141 and 142 are sufficiently long to prevent creep effects between layers 131 and 132, as well as between layers 133 and 134.

Dielectric ledge 145, integral with housing segment 123, extends outwardly from the outer edge of side wall 125 in a central region of housing 121 between the ends of layers 131, 132 and layers 133, 134 along the side wall. Ledge 145 carries plastic housing 146 for ferrite, annular magnetic core 44. Wound on the exterior of housing 146 is single layer torroidal winding 34 having a relatively low distributed capacitance. One terminal or end of winding 34 is connected via high voltage wires 147 and 148 to layers 132 and 133, respectively. The other terminal or end of winding 34 is connected by high voltage wires 149 and 150 to the cathode and anode of diodes 152 and 153, respectively. The capacitors of rectifier 54 are formed by layers 131 and 132 and the intervening dielectric of end face 126 and by layers 133 and 134 and the intervening dielectric of end face 127.

Housings 161 and 162, identical to housing 121, are respectively provided for the secondary winding assemblies including rectifiers 53 and 55. Only the upper and lower portions of housings 161 and 162 are illustrated in FIG. 5. Thus, housings 161 and 162 include nonmagnetic metal layers 163 and 164 on the upper and lower end faces 165 and 166 thereof. Layers 163 and 134 are electrically connected to each other by metal strut 166, while layers 131 and 164 are electrically connected to each other by metal strut 167. Metal struts 166 and 167 may take any suitable form, such as threaded posts extending from each of layers 131, 164 and 134, 163. The metal posts are electrically and mechanically connected together by a metal sleeve having a threaded interior wall.

To provide the optimum electric field stress conditions for the symmetrical, cylindrical geometry of tank 22 and each of the secondary winding assemblies, the ratio of the radii of adjacent electrostatic shielding elements to each other should be as close to e, the base of natural logarithms (2.7), as possible. In actuality, it is satisfactory for the ratio to be in the range of between 2.5 and 3.3 to achieve virtually the same conditions as subsist for the optimum situation. The most important of these ratios concerns the radii of layer 111 relative to axis 102 and the common radii of coatings 131 and 134 on wall 125 relative to axis 102. This is because the electrostatic stress on the dielectric is greatest in the region between layers 111 and 131, for that portion of layer 131 which extends along wall 125. In the preferred embodiment, the radii of the metal parts relative to axis 102 are:

| | |
|---|---|
| layer 111 | 11.1 mm |
| layers 131 and 134 along wall 125 | 35.6 mm |
| layers 131 and 134 on the outer face of ears 128 and 129 | 88.9 mm |
| layer 107 | 114 mm |

The circuitry for energizing filament 20 is mounted on an assembly similar to that illustrated in FIG. 5, at the top of tank 101, just below the upper end face 105 thereof. The housing for the components that energize filament 20, however, does not have the metal coated layers thereon, but is secured to interior wall 103 in the same manner that the housing of FIG. 5 is secured to the interior wall. The housing for the components that energizes filament 20 carries, on the upper wall of the lower end face thereof, three coaxial stacked small ferrite cores comprising core 304 of transformer 303. Winding 305 is wound on the stacked ferrite cores. Aligned with the passageway defining the aligned inner diameters of the stacked ferrite cores is an aperture in the lower and upper end faces of the housing. High voltage lead wire 48 traverses these apertures as well as a passage defined by the aligned inner diameters of the stacked ferrite cores comprising core 304.

Lead wire 48 is looped back to one of the terminals of connector 306 beyond the peripheries of the annular end walls of the housing on which the ferrite cores are mounted. Primary winding 305 of transformer 303 is driven by the 50kHz output of inverter 301 by a pair of leads that extend through the top end face of tank 301 via a sealed low voltage connector (not shown). Inverter 301, amplifier 404 and controller 405 are mounted on rotating gantry 15, so that the same slip ring assembly 16 can be used to power inverters 24 and 301.

In accordance with another embodiment of the invention, the housings of the secondary winding assemblies are configured so that the high voltage end faces thereof are terminated in continuously curved surfaces, defining a semicircle, to reduce the electric field stress to a level less than is attained with the housing illustrated in FIG. 5. A schematic diagram of such a housing is illustrated in FIG. 6.

Figure 6:
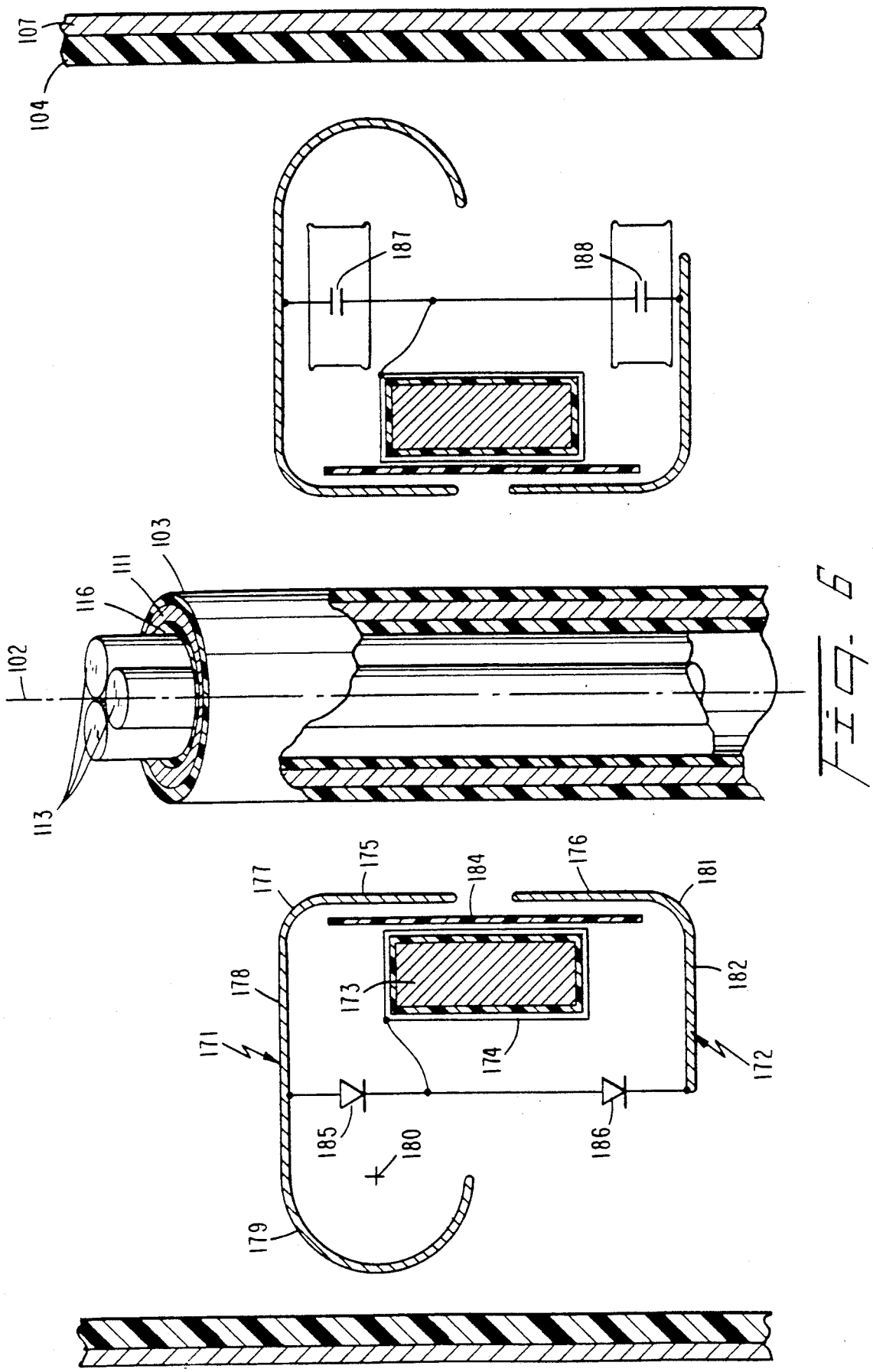
FIG. 6 is a schematic diagram of another embodiment of a secondary winding assembly according to the invention.

The housing in FIG. 6 includes upper and lower metal segments 171 and 172 in which are located ferrite annular magnetic core 173, about which winding 174 is wound. Upper and lower housing segments 171 and 172 include longitudinally extending metal inner wall segments 175 and 176, spaced from each other so that the voltage developed by the secondary winding assembly can be developed across them. The spacing between adjacent edges of wall segments 175 and 176 is sufficient to prevent creep effects. Wall segment 175 is connected by 90° fillet 177 to straight end face segment 178.

The end of segment 178 remote from fillet 177 is terminated in curved metal wall segment 179, which in cross-section is formed as a semicircle having a center of curvature 180 aligned with the point of tangency between straight segment 178 and curved segment 179. Segment 176 is connected by fillet 181 to bottom end face 182, that is parallel to end face 178. Upper and lower metal segments 171 and 172 are secured to each other by dielectric tube 184, to which they are bonded.

The diodes and capacitors of the secondary winding assembly illustrated in FIG. 6 are schematically illustrated as discrete devices such that diodes 185 and 186 are series connected to each other between upper and lower segments 171 and 172, with a common connection of the cathode of diode 185 and the anode of diode 186 to one terminal of winding 174. Similarly, capacitors 187 and 188 are series connected with each other between upper and lower segments 171 and 172, with a common connection of the capacitors to the other terminal of winding 174.

In the preferred embodiment, layers 107 and 111 have radii of 114mm and 11.1mm relative to center line 102, while walls 175 and 176 have common radii of 35.6mm from center line 102. The point on curved surface 179 which is tangent to a line parallel to center line 102 is spaced from the center line by 88.9mm. The radius of curvature of surface 179 is 11.1mm.

Figure 7:
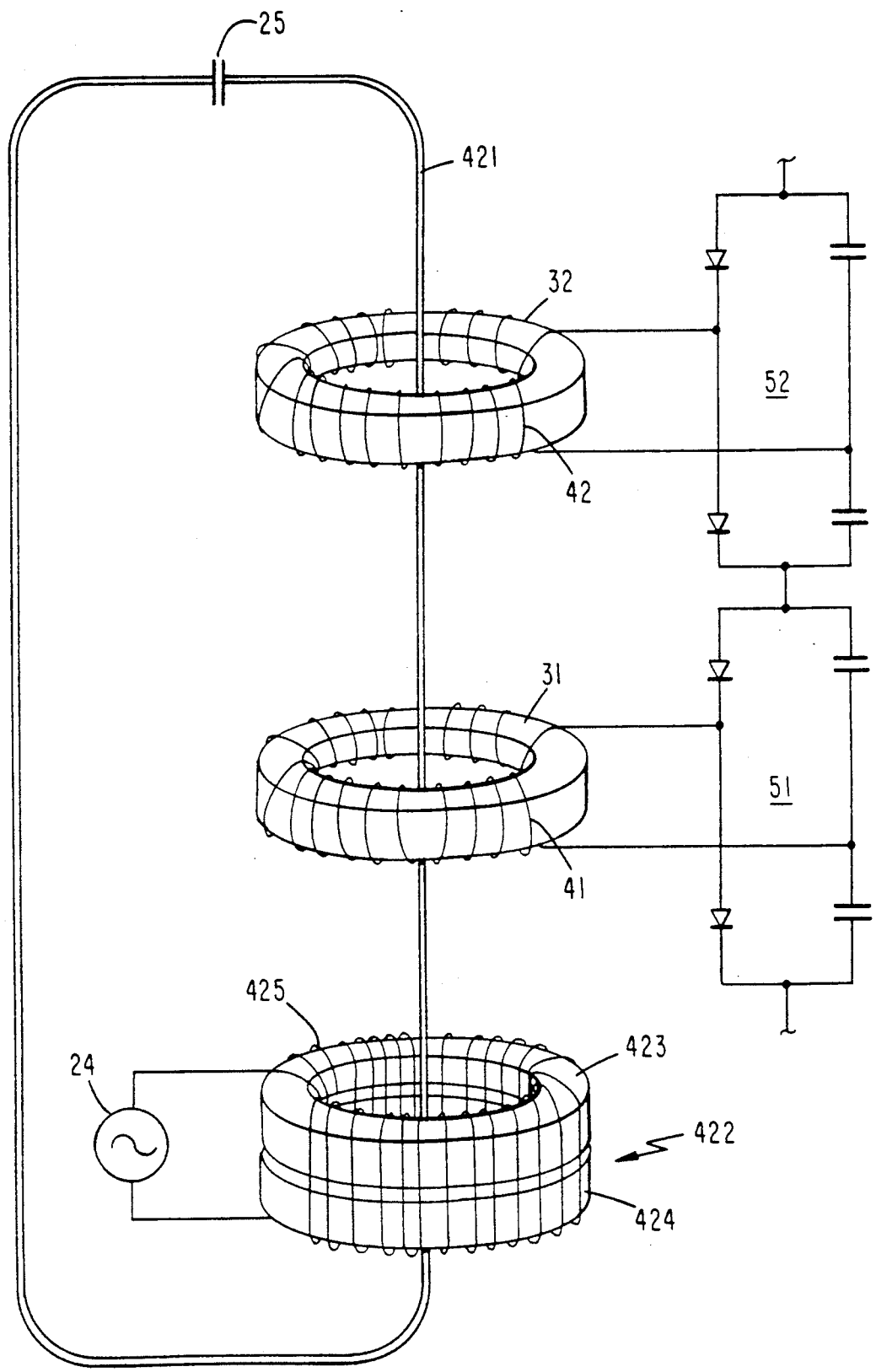
FIG. 7 is a schematic diagram of another embodiment of the invention wherein a single turn primary winding in a tank similar to that illustrated in FIG. 3A is responsive to the output of an inverter that derives a winding on a magnetic core in the tank.

Reference is now made to FIG. 7 of the drawing wherein there is illustrated a schematic diagram of a further embodiment of the invention. In the embodiment of FIG. 7, the single turn primary winding of tank 101, FIG. 3A, comprising layers 107, 109 and 111, is schematically illustrated as single turn winding 421, having resonating capacitor 25 connected in series with it. Capacitor 25 is connected between the upper edges of layers 107 and 111. Single turn primary winding 421 is excited by the output of inverter 24 via transformer 422. Transformer 422 includes a pair of abutting ferrite magnetic cores 423 and 424. The inner diameter of each of cores 423 and 424 is substantially less than that of cores 31 and 32. This is possible because the potentials of windings 421 and 425 are somewhat the same. The outer diameter of each of cores 423 and 424 is such that the sum of the cross sectional area of these cores is about equal to the sum of the cross sectional area of the cores through which winding 421 is threaded. These sums are about the same to provide impedance matching between windings 421 and 425.

Cores 423 and 424 are located in the volume of tank 101 between layers 107 and 111 concentrically with cores 31-36. Winding 425, having opposite terminals connected to the output of inverter 24 via sealed openings in the interior cylindrical wall of tank 101, is wound on cores 423 and 424. Since layer 111 extends through the aperture of ferrite cores 423 and 424, winding 421 (formed by layers 107, 109 and 111) is basically a single turn secondary winding of transformer 422. The current from inverter 24 induces a current in winding 421. The current flowing in winding 421 is transformer coupled to windings 41-46 as a result of the transformer action between winding 421 and windings 41-46 via cores 31-36. The structure schematically illustrated in FIG. 7 thus functions in basically the same manner as the structure described supra, in connection with FIG. 3A.

The coaxial geometry of layers 111, 131 along wall 125 and along ears 128 and 129 and of layer 107 enables the maximum field stress exerted on the dielectric in tank 101 to be relatively easily predicted and to be optimized. It can be shown that, in the event of load arcing, the voltages across the secondary winding assemblies remain equally distributed so they are exactly the same as in the DC case. In addition, it was found that current supplied by inverter 24 to transformer primary winding 30 rises in a predictable and controlled manner, allowing ample time to detect an arc and, thereby, protect the inverter. There has been speculation that the significant spacing between the single turn primary winding 30 and each of the secondary windings resulted in the formation of an improper high voltage isolation transformer structure that is not suited to couple power up to 50 or 60kW between the primary and secondary windings It has been shown, however, that proper coupling of the rated power between the primary and secondary winding assemblies is achieved with the described transformer structure, despite the high leakage thereof. The high series leakage inductance is effectively removed by the resonant circuit, to permit effective power transfer across the high leakage interface. Because the leakage inductance of the transformer is determined by the geometry of the single turn primary, the use of several secondary winding assemblies does not significantly increase the total leakage inductance of the power supply.

Tests have been conducted on a secondary winding assembly similar to the type illustrated in FIG. 5. The tested structure employed discrete capacitors and used solid metal core-like structures to form shields similar to those of layers 131 and 134. Such a structure, with the dimensions indicated for layers 111, 131 and 107, has a secondary leakage inductance of about 1 millihenry. This secondary leakage inductance is reflected to single turn primary winding 30 by a factor equal to the square of the ratio of the number of turns of a secondary winding assembly to the single turn of the primary; hence the 1 millihenry inductance of each secondary winding assembly is transformed into an inductance of 2.7 nanohenrys. For a power supply having six secondary winding assemblies, the total reflected leakage inductance is 16.2 nanohenrys. This inductance is small compared to the approximately 400 nanohenrys inductance of single turn primary winding 30. Hence, the use of multiple secondary winding assemblies does not significantly change the inductance of the primary winding circuit and, therefore, does not appreciably affect the value of resonating capacitor 25.

The desiderata initially set forth in this document are achieved with the specifically described structure of FIG. 7, as referenced to FIG. 3A. Tank 301 has the convenient cylindrical shape, relatively small dimensions, and weight, set forth supra. The stored energy of the device is 2–3 joules, and the −150kV DC output has a ripple of 3 percent peak to peak at the frequency of inverter 24, and less than 0.02 percent, for frequencies less than 2kHz. Full voltage can be achieved in approximately 80 microseconds and the unit can be shut down during a fraction of a cycle of the approximately 160kHz output of inverter 24. The device is relatively easy to repair and manufacture due to its use of multiple identical secondary winding assemblies or modules and because of the use of fluid dielectrics. If one of the high voltage secondary winding assemblies fails, the high voltage DC output is reduced only by the proportional amount of the voltage contribution of the particular assembly In response to an arc occurring in X-ray tube 17, the arc voltage is distributed equally amongst all of the secondary winding assemblies.

While there have been described and illustrated several specific embodiments of the invention, it will be clear that variations in the details of the embodiment specifically illustrated and described may be made without departing from the true spirit and scope of the invention as defined in the appended claims. For example, for certain applications, the complete cylindrical symmetry is not necessary. Somewhat similar results can be achieved by providing continuously curved surfaces of the outer wall of the primary winding in regions in closest proximity to the secondary winding assemblies. Also, while a primary purpose of the invention is to provide power to an X-ray tube having power requirements of between 15 and 60kW, at a voltage of 150kV, the principles of the invention can be used for powering loads having higher and lower voltage and power requirements.

I claim:

1. A high voltage, high power DC power supply comprising an AC source having a frequency in excess of about 100kHz, a transformer having: a single turn primary winding responsive to said source and arranged to respond to the source to derive a magnetic field having flux lines concentric with a longitudinal axis in planes at right angles to the axis, the primary winding including a first metal cylindrical wall coaxial with said longitudinal axis and a second metal wall surrounding the first metal wall, the second wall having only continuously curved surfaces in proximity to the first wall, the first and second walls having ends electrically connected to each other so that the ends are at the same electric potential, plural secondary winding and rectifier assemblies magnetically coupled to the primary winding for developing a portion of the high voltage DC derived by the power supply, each of said assemblies having a different axial position relative to the length of the first wall and being in a volume between the first and second walls; each of said assemblies including: a magnetic core having a circular inner diameter coaxial with said first wall and an outer diameter having only curved surfaces, a winding wound about each of said cores, rectifier means connected to the winding of each of the assemblies for developing a DC voltage, the spacing from the inner wall to the inner diameter and from the outer diameter to the outer wall being such that the windings of secondary assemblies are loosely magnetically coupled to the primary winding so that each of the secondary winding assemblies has an appreciable parasitic inductance and a relatively small capacitance; means within the volume for adding the developed voltages together; and a capacitor connected in series with the primary winding, the capacitor having a value for approximately resonating the transformer to the source.

2. The power supply of claim 1, wherein said first and second walls are concentric cylindrical surfaces, each of said assemblies including: a generally annular non-magnetic housing concentric with the first wall having (a) a cylindrical wall segment with a non-magnetic metal surface coaxial with the housing and extending in the axial direction of the first wall and (b) first and second end faces extending at right angles to the cylindrical wall segment, each of said end faces including a non-magnetic metal surface, said metal surfaces of each assembly being arranged so that said portion of the high voltage DC is developed across the first and second end faces, an annular magnetic core in said housing coaxial with the housing, a toroidal coil wound about the magnetic core having first and second terminals, first and second capacitors positioned between said metal surfaces of the first and second end faces and arranged so that first and second electrodes of said capacitors are respectively at the potentials of the metal surfaces of the first and second end faces and other electrodes of said capacitors are connected to said first terminal, first and second diodes positioned between said metal surfaces of the first and second end faces and arranged so that first and second electrodes of said diodes are respectively at the potentials of the metal surfaces of the first and second end faces and other electrodes of said diodes are connected to said second terminal.

3. The power supply of claim 2, wherein said metal wall surfaces of one of said assemblies contact each other only via a smoothly curved metal transitional region.

4. The power supply of claim 3, wherein each of the transitional regions is configured as a 90° arc of a circle in a plane transverse to the end face and including the longitudinal axis of the cylindrical wall.

5. The power supply of claim 4, wherein each housing includes an ear with a metal surface extending from one of the end faces in a direction generally transverse to the end faces, the metal surfaces of the ear being formed as an arc of about 180° in a plane transverse to the end faces and including the longitudinal axis of the cylindrical wall, the metal surfaces of said one end face and ear being tangent where they are connected to each other.

6. The power supply of claim 2 wherein the ratio of the radii of the first metal cylindrical wall to the metal surface of the cylindrical wall segment is approximately 2.7.

7. The power supply of claim 2 wherein each of said end faces includes a dielectric base having metal layers on opposite surfaces thereof transverse to the cylindrical wall segment, said capacitors including said dielectric bases and metal layers.

8. The power supply of claim 2 wherein said housing includes a dielectric base separating metal surfaces extending between said end faces for preventing creep effect breakdown.

9. The power supply of claim 8 wherein said diodes are mounted on said base.

10. The power supply of claim 8 wherein each of said end faces includes a dielectric base having metal layers on opposite surfaces thereof transverse to the cylindrical wall segment, said capacitors including said dielectric bases and metal layers 11. The power supply of claim 1 wherein said volume is filled with dielectric oil having a predetermined dielectric constant, said walls being covered with a solid dielectric in the volume, the solid dielectric having approximately the predetermined dielectric constant.

12. The power supply of claim 1 wherein the winding is a torroidal winding wound as a single layer on the core.

13. A secondary winding assembly for an AC to high voltage DC converter, said assembly developing a portion of the high voltage DC, a plurality of said assemblies being adapted to be connected together to develop the high voltage DC and to be located concentrically with a longitudinal axis, a primary winding of a transformer included in the converter, said assembly including: a generally annular non-magnetic housing adapted to be concentric with the axis and having (a) a cylindrical wall segment with a non-magnetic metal surface coaxial with the axis and extending in the direction of the axis and (b) first and second end faces extending transversely to the axis, each of said end faces including a non-magnetic metal surface, said non-magnetic metal surfaces of the assembly being arranged so that said portion of the high voltage DC is developed across the metal surfaces of the end faces, an annular magnetic core in said housing coaxial with the axis, a torroidal coil wound about the magnetic core having first and second terminals, first and second capacitors positioned between said metal surfaces of the end faces arranged so that first and second electrodes of said capacitors are respectively at the potentials of the metal surfaces of the first and second end faces and other electrodes of said capacitors are connected to said first terminal, first and second diodes positioned between said metal surfaces arranged so that first and second electrodes of said diodes are respectively at the potentials of the metal surfaces of the first and second end faces and other electrodes of said diodes are connected to said second terminal.

14. The assembly of claim 13, wherein said metal surfaces contact each other only via smoothly curved metal transitional regions.

15. The assembly of claim 14, wherein the transitional region is configured as a 90° arc of a circle in a plane transverse to the end face and including the longitudinal axis.

16. The assembly of claim 14, wherein the transitional region is configured as a 90° arc of a circle in a plane transverse to the end faces and including the longitudinal axis wherein the housing includes an ear with a metal surface extending from one of the end faces in a direction generally transverse to the end faces, the metal surfaces of the ear formed as an arc of about 180° in a plane transverse to the end face and including the longitudinal axis metal surfaces of the end face and ear being tangent where they are connected to each other.

17. The assembly of claim 13, wherein the housing includes an ear with a metal surface extending from one of the end faces in a direction generally transverse to the end faces, the metal surfaces of the ear formed as an arc of about 180° in a plane transverse to the end face and including the longitudinal axis of the metal surfaces end face and ear being tangent where they are connected to each other.

18. The assembly of claim 13, wherein the torroidal winding is wound as a single layer on the magnetic core.

19. The assembly of claim 13, wherein each of said end faces includes a dielectric base having metal layers on opposite surfaces thereof transverse to the cylindrical wall segment, said capacitors including said dielectric bases and metal layers.

20. The assembly of claim 13, wherein said housing includes a dielectric base separating metal surfaces extending between said end faces for preventing creep effect breakdown.

21. The assembly of claim 20, wherein said diodes are mounted on said base.

22. The assembly of claim 21, wherein each of said end faces includes a dielectric base having metal layers on opposite surfaces thereof transverse to the cylindrical wall segment, said capacitors including said dielectric bases and metal layers.

23. A device for a high voltage, high power DC power supply comprising a transformer having: a single turn primary winding adapted to be responsive to an AC source and arranged to respond to the source to derive a magnetic field having flux lines concentric with a longitudinal axis in planes at right angles to the axis, the primary winding including a first metal cylindrical wall and a second metal wall surrounding the first metal wall, said walls being concentric with the axis, the second wall having only continuously curved surfaces in proximity to the first wall, the first and second walls having ends electrically connected to each other so that the ends are at the same electric potential, plural secondary winding and rectifier assemblies magnetically coupled to be responsive to the magnetic field flux lines to the primary winding for developing a portion of the high voltage DC derived by the power supply, each of said assemblies having a different axial position relative to the length of the first wall and being in a volume between the first and second walls; each of said assemblies including: a magnetic core having a circular inner diameter coaxial with said first wall and an outer diameter having only curved surfaces, a winding in each of said assemblies, a rectifier connected to said winding for developing the portion of the high voltage associated with each winding assembly, the spacing from the inner wall to the inner diameter and from the outer diameter to the outer wall being such that the windings of secondary assemblies are loosely magnetically coupled to the primary winding and each of the secondary winding assemblies has a relatively small distributed capacitance.

24. The device of claim 23 wherein said first and second walls are concentric cylindrical surfaces, each of said assemblies including: a generally annular non-magnetic housing concentric with the first wall having (a) a cylindrical wall segment with a non-magnetic metal surface coaxial with the housing and extending in the axial direction of the first wall and (b) first and second end faces extending at right angles to the cylindrical wall segment, each of said end faces including a non-magnetic metal surface, said metal surfaces of the assembly being arranged so that said portion of the high voltage DC is developed across the first and second end faces, said core being an annular magnetic core in said housing coaxial with the housing, said winding of the assembly including a torroidal coil wound about the magnetic core, said winding having first and second ends, said rectifier including first and second capacitors and first and second diodes, said first and second capacitors being positioned between said metal surfaces of the first and second end faces and arranged so that first and second electrodes of said capacitors are respectively at the potentials of the metal surfaces of the first and second end faces and other electrodes of said capacitors are connected to said first end, said first and second diodes being positioned between said metal surfaces of the first and second end faces and arranged so that first and second electrodes of said diodes are respectively at the potentials of the metal surfaces of the first and second end faces and other electrodes of said diodes are connected to said second end.

25. A high voltage, high power DC power supply comprising an AC source having a frequency in excess of about 100kHz, a transformer having: a primary winding responsive to said source and arranged to respond to the source to derive a magnetic field having flux lines concentric with a longitudinal axis in planes at right angles to the axis, a first metal cylindrical wall and a second metal wall surrounding the first metal wall, said walls being concentric with the axis, the second wall having only continuously curved surfaces in proximity to the first wall, plural secondary winding and rectifier assemblies magnetically coupled to the primary winding to be responsive to the magnetic field flux lines for developing a portion of the high voltage DC derived by the power supply, each of said assemblies having a different axial position relative to the length of the first wall and being in a volume between the first and second walls; each of said assemblies including: a magnetic core having a circular inner diameter coaxial with said first wall and an outer diameter having only curved surfaces, a winding wound about each of said cores, rectifier means connected to the winding of each of the assemblies for developing a DC voltage, the spacing from the inner wall to the inner diameter and from the outer diameter to the outer wall being such that the windings of secondary assemblies are loosely magnetically coupled to the primary winding so that each of the secondary winding assemblies has an appreciable parasitic inductance and a relatively small capacitance; means within the volume for adding the developed voltages together; and a capacitor connected in series with the primary winding, the capacitor having a value for approximately resonating the transformer to the source.

26. A power supply of claim 25, wherein said first and second walls are concentric cylindrical surfaces, each of said assemblies including: a generally annular non-magnetic housing concentric with the first wall having (a) a cylindrical wall segment with a non-magnetic metal surface coaxial with the housing and extending in the axial direction of the first wall and (b) first and second end faces extending at right angles to the cylindrical wall segment, each of said end faces including a non-magnetic metal surface, said metal surfaces of the assembly being arranged so that said portion of the high voltage DC is developed across the first and second end faces, said core being an annular magnetic core in said housing coaxial with the housing, the winding of the assembly being a torroidal coil wound about the magnetic core having first and second terminals, first and second capacitors positioned between said metal surfaces of the first and second end faces and arranged so that first and second electrodes of said capacitors are respectively at the potentials of the metal surfaces of the first and second end faces and other electrodes of said capacitors are connected to said first terminal, first and second diodes positioned between said metal surfaces of the first and second end faces and arranged so that first and second electrodes of said diodes are respectively at the potentials of the metal surfaces of the first and second end faces and other electrodes of said diodes are connected to said second terminal.

27. The power supply of claim 26 wherein the primary winding includes a lead extending longitudinally through the first metal cylindrical wall.

28. The power supply of claim 27 wherein the lead extends longitudinally through the first metal wall several times.

29. The power supply of claim 25 wherein the primary winding includes a lead extending longitudinally through the first metal cylindrical wall.

30. The power supply of claim 29 wherein the lead extends longitudinally through the first metal wall several times.

31. A device for a high voltage, high power DC power supply comprising a transformer having: a primary winding adapted to be responsive to an AC source and arranged to respond to the source to derive a magnetic field having flux lines concentric with a longitudinal axis in planes at right angles to the axis, a first metal cylindrical wall and a second metal wall surrounding the first metal wall, said walls being concentric with the axis, the second wall having only continuously curved surfaces in proximity to the first wall, the primary winding extending in the direction of the longitudinal axis, plural secondary winding and rectifier assemblies magnetically coupled to the primary winding to be responsive to the magnetic field flux lines for developing a portion of the high voltage DC derived by the power supply, each of said assemblies having a different axial position relative to the length of the first wall and being in a volume between the first and second walls; each of said assemblies including: a magnetic core having a circular inner diameter coaxial with and outside said first wall and an outer diameter having only curved surfaces, a winding on said core, a rectifier connected to said winding for developing the portion of the high voltage associated with each winding assembly, the spacing from the primary winding to the inner diameter and from the outer diameter to the outer wall being such that the windings of secondary assemblies are loosely magnetically coupled to the primary winding and each of the secondary winding assemblies has a relatively small distributed capacitance.

32. The device of claim 31 wherein said first and second walls are concentric cylindrical surfaces, each of said assemblies including: a generally annular non-magnetic housing concentric with the first wall having (a) a cylindrical wall segment with a non-magnetic metal surface coaxial with the housing and extending in the axial direction of the first wall and (b) first and second end faces extending at right angles to the cylindrical wall segment, each of said end faces including a non-magnetic metal surface, said metal surfaces of the assembly being arranged so that said portion of the high voltage DC is developed across the first and second end faces, said core being an annular magnetic core in said housing coaxial with the housing, said winding including a torroidal coil wound about the magnetic core, said winding having first and second ends, said rectifier including first and second capacitors and first and second diodes, said first and second capacitors being positioned between said metal surfaces of the first and second end faces and arranged so that first and second electrodes of said capacitors are respectively at the potentials of the metal surfaces of the first and second end faces and other electrodes of said capacitors are connected to said first end, said first and second diodes being positioned between said metal surfaces of the first and second end faces and arranged so that first and second electrodes of said diodes are respectively at the potentials of the metal surfaces of the first and second end faces and other electrodes of said diodes are connected to said second end.

33. The device of claim 31 wherein the primary winding includes a lead extending longitudinally through the first metal cylindrical wall.

34. The power supply of claim 33 wherein the lead extends longitudinally through the first metal wall several times.

35. The device of claim 31 wherein the primary winding has only a single turn including the first and second walls, one end of the first and second walls being electrically connected to each other so they are at the same electric potential.

36. A high voltage, high power DC power supply comprising primary winding means adapted to be responsive to an AC source for deriving magnetic flux lines concentric with a longitudinal axis in planes at right angles to the axis, current from the source flowing in the winding means in the direction of the axis to derive said flux lines, first and second metal walls concentric with and surrounding said axis and having only continuously curved surfaces, said first wall being between the axis and the second wall, said magnetic flux lines being developed in a volume between the metal walls, plural secondary winding and rectifier assemblies magnetically coupled to the primary winding means, each of said assemblies developing a portion of the high voltage DC derived by the supply, each of said assemblies having a different axial position along the length of the axis and being in the volume between the first and second walls; each of said assemblies including: a magnetic core having a circular inner diameter coaxial with said axis and an outer diameter having only curved surfaces, a winding on said core, the core and winding interacting with the magnetic flux lines to induce a substantial AC voltage across terminals of the winding, rectifier and capacitor means connected to said terminals for developing the portion of the high voltage associated with the winding assembly, and a non-magnetic metal wall segment having continuously curved surfaces concentric with the axis and extending in the direction of the axis, the rectifier and capacitor means and the core and the coil being between the wall segment and one of the walls.

37. The power supply of claim 36 wherein the AC source is included in said source, said source having a frequency of at least approximately 100 kHz.

38. The power supply of claim 37 further including a capacitor connected in circuit with said primary winding means and said source for establishing a resonant circuit at approximately the source frequency.

39. The power supply of claim 36 wherein each assembly includes another metal wall segment concentric with and surrounding said axis, the rectifier and capacitor means and the core and the coil of each assembly being between said wall segments of the corresponding assembly.

40. The power supply of claim 36 wherein said primary winding means includes said first metal wall so that one end of the first metal wall is connected to be responsive to current from the source, the other end of the first metal wall being connected to a reference potential and the second metal wall, the current from the source flowing in the first metal wall to establish the magnetic flux lines.

41. The power supply of claim 36 wherein the primary winding means includes a lead wire extending in the direction of the axis in a volume from the axis to the first metal wall, the first and second metal walls having no galvanic connection, the lead wire being coupled to the source so that current derived from the source flows in the lead wire to establish the magnetic flux lines.

42. The power supply of claim 41 wherein several loops of the lead wire extend longitudinally in the volume from the axis to the first metal wall.

43. The power supply of claim 36 wherein the spacing from the first wall to the inner diameter and from the outer diameter to the second wall are such that the windings of secondary assemblies are loosely magnetically coupled to the primary winding and each of the secondary winding assemblies has a relatively small distributed capacitance.

44. The power supply of claim 36 wherein said metal wall segment and metal walls are circular in planes at right angles to the axis to establish equipotential circular regions concentric with the axis, equipotential circular regions having radii relative to the axis such that the radii of adjacent ones of the regions have ratios of approximately 2.7.

45. The power supply of claim 44 wherein each assembly includes a metal inner wall segment surrounding the first metal wall, the core, rectifier and capacitor means and coil of each assembly being between the inner and outer wall segments, the inner wall segment establishing one of said equipotential circular regions.

46. The power supply of claim 36 wherein said first and second walls are concentric cylindrical surfaces coaxial with said axis, each of said assemblies including: a generally annular non-magnetic housing concentric with the axis having first and second end faces extending at right angles to the axis, each of said end faces including a non-magnetic metal surface, said metal surfaces of each assembly being arranged so that said portion of the high voltage DC is developed across the first and second end faces, the core being an annular magnetic core in said housing coaxial with the housing, the coil being a torroidal coil wound about the magnetic core having first and second terminals, the rectifier and capacitor means including: (a) first and second capacitors positioned between said metal surfaces of the first and second end faces and arranged so that first and second electrodes of said capacitors are respectively at the potentials of the metal surfaces of the first and second end faces and other electrodes of said capacitors are connected to said first terminal, and (b) first and second diodes positioned between said metal surfaces of the first and second end faces and arranged so that first and second electrodes of said diodes are respectively at the potentials of the metal surfaces of the first and second end faces and other electrodes of said diodes are connected to said second terminal.

47. The power supply of claim 46 wherein said metal wall surfaces of said assemblies contact each other only via a smoothly curved metal transitional region.

48. The power supply of claim 47 wherein each of the transitional regions is configured as a 90° arc of a circle in a plane transverse to the end faces and including the axis.

49. The power supply of claim 48 wherein each housing includes an ear with a metal surface extending from one of the end faces in a direction generally transverse to the end faces, the metal surfaces of the ear being formed as an arc of about 180° in a plane transverse to the end faces and including the metal surfaces of said one end face and ear being tangent where they are connected to each other.

50. The power supply of claim 46 wherein each of said end faces includes a dielectric base having metal layers on opposite surfaces thereof transverse to the cylindrical wall segment, said capacitors including said dielectric bases and metal layers.

51. The power supply of claim 46 wherein said housing includes a dielectric base separating metal surfaces extending between said end faces for preventing creep effect breakdown.

52. The power supply of claim 51 wherein said diodes are mounted on said base.

53. The power supply of claim 51 wherein each of said end faces includes a dielectric base having metal layers on opposite surfaces thereof transverse to the cylindrical wall segment, said capacitors including said dielectric bases and metal layers.

54. The power supply of claim 36 wherein said volume is filled with dielectric oil having a predetermined dielectric constant, said walls being covered with a solid dielectric in the volume, the solid dielectric having approximately the predetermined dielectric constant.

55. The power supply of claim 36 wherein the winding is a torroidal winding wound as a single layer on the core.

56. The power supply of claim 36 further in combination with an x-ray tube assembly including a rotatable gantry on which are mounted an x-ray tube, a portion of a high voltage power supply for anode cathode electrodes of the x-ray tube and a slip ring assembly for feeding relatively low voltage from an excitation source to the portion of the high voltage power supply on the gantry; the supply including the AC source, the AC source having a frequency of about at least 100 kHz; the portion of the supply on the gantry including the primary winding means, the first and second metal walls, and the plural secondary winding and rectifier assemblies; and a capacitor connected in circuit with the primary winding means and the AC source for establishing a resonant circuit approximately at the source frequency.

57. The power supply of claim 56 further including a floating supply for a filament of the tube, at least a portion of the floating supply being mounted on the gantry, the floating supply including a high voltage wire in the volume between the first and second walls, the high voltage wire being connected to a terminal of the filament and extending through an opening of an annular magnetic core on which is wound a winding, the wire being connected to the assembly having the highest voltage so that said wire and the highest voltage assembly are at substantially the same DC potential, an AC supply energized via said slip ring assembly connected to said winding of the magnetic core through which the high voltage wire extends.

58. The power supply of claim 56 further including means for deriving an indication of DC voltage supplied across the electrodes of said tube, and means for controlling the power supplied to the primary winding in response to the derived DC voltage indication.

59. The power supply of claim 58, wherein the control means includes means for varying the frequency of the AC supply having a frequency of at least 100kHz.

60. The power supply of claim 56 wherein the x-ray tube has: a maximum power requirement of about 60 kW, a grounded anode and an electron emitting electrode having a DC voltage requirement of about $-150$kV, the 60kW and $-150$kV requirements being established by the high voltage power supply portion on the gantry.

61. The power supply of claim 60 wherein the tube includes a filament, a floating power supply on the gantry for supplying current to the filament, the current supplied to the filament being at about the same DC voltage as the cathode.

62. The power supply of claim 61 wherein the floating power supply includes a high voltage wire, the high voltage wire being connected to opposite terminals of the filament and extending through an opening of an annular magnetic core on which is wound a winding, an AC supply connected to said winding of the magnetic core through which the high voltage wire extends.

63. The power supply of claim 62 further including means for deriving an indication of DC voltage supplied across the anode and said electrode of said tube, and means for controlling the power supplied to the primary winding in response to the derived DC voltage indication.

64. The power supply of claim 62 further including means for controlling the amplitude of current supplied to the filament as a function of the X-ray tube current.

65. The power supply of claim 60 further including means for deriving an indication of DC voltage supplied between the anode and said electrode of said tube, and means for controlling the power supplied to the primary winding in response to the derived DC voltage indication.

66. The power supply of claim 65 wherein the control means includes means for varying the frequency of the AC supply.

67. The power supply of claim 66 wherein the capacitor and primary winding comprise a resonant circuit having a resonant frequency less than the minimum frequency of the AC supply.

* * * * *